United States Patent
Ebrahimi Afrouzi et al.

(10) Patent No.: US 11,254,002 B1
(45) Date of Patent: Feb. 22, 2022

(54) AUTONOMOUS ROBOTIC DEVICE

(71) Applicants: Ali Ebrahimi Afrouzi, San Jose, CA (US); Lukas Fath, York (CA)

(72) Inventors: Ali Ebrahimi Afrouzi, San Jose, CA (US); Lukas Fath, York (CA)

(73) Assignee: AI Incorporated, Toronto (CA)

(*) Notice: Subject to any disclaimer, the term of this patent is extended or adjusted under 35 U.S.C. 154(b) by 391 days.

(21) Appl. No.: 16/353,019

(22) Filed: Mar. 14, 2019

Related U.S. Application Data

(60) Provisional application No. 62/644,772, filed on Mar. 19, 2018.

(51) Int. Cl.
*B25J 9/16* (2006.01)
*G05B 13/02* (2006.01)

(52) U.S. Cl.
CPC ............ *B25J 9/1664* (2013.01); *B25J 9/163* (2013.01); *B25J 9/1697* (2013.01); *G05B 13/027* (2013.01)

(58) Field of Classification Search
CPC ........ B25J 9/1664; B25J 9/163; B25J 9/1697; B25J 9/161; G05B 13/027; G05D 1/0219
See application file for complete search history.

(56) References Cited

U.S. PATENT DOCUMENTS

| | | | |
|---|---|---|---|
| 6,781,338 B2 | 8/2004 | Jones | |
| 7,211,980 B1 | 5/2007 | Bruemmer | |
| 7,689,321 B2 | 3/2010 | Karlsson | |
| 7,826,926 B2 | 11/2010 | Myeong | |
| 7,957,836 B2 | 6/2011 | Myeong | |
| 8,452,450 B2 | 5/2013 | Dooley | |
| 9,427,874 B1 | 8/2016 | Rublee | |
| 10,514,694 B1 * | 12/2019 | Mundhenk | G06N 3/088 |
| 10,926,408 B1 * | 2/2021 | Vogelsong | B25J 9/1671 |
| 2004/0158354 A1 | 8/2004 | Lee | |
| 2008/0075357 A1 | 3/2008 | Yoon | |
| 2008/0232678 A1 | 9/2008 | Yoon | |
| 2010/0152945 A1 | 6/2010 | Park | |
| 2010/0256908 A1 | 10/2010 | Shimshoni | |
| 2011/0082585 A1 | 4/2011 | Sofman | |
| 2012/0213443 A1 | 8/2012 | Shin | |
| 2013/0138247 A1 | 5/2013 | Gutmann | |
| 2014/0129027 A1 | 5/2014 | Schnittman | |

(Continued)

FOREIGN PATENT DOCUMENTS

EP 3571664 A1 * 11/2019 ............ G06N 3/0445

*Primary Examiner* — Robert T Nguyen

(57) ABSTRACT

Provided is a robotic device including a medium storing instructions that when executed by one or more processors effectuate operations including: capturing, with a camera, spatial data of surroundings; generating, with the one or more processors, a movement path based on the spatial data; predicting, with the one or more processors, a new predicted state of the robotic device including at least a predicted position of the robotic device, wherein predicting the new predicted state includes: capturing, with at least one sensor, movement readings of the robotic device; predicting, with the one or more processors, the new predicted state using a motion model of the robotic device based on a previous predicted state of the robotic device and the movement readings; and updating, with the one or more processors, the movement path to exclude locations of the movement path that the robotic device has previously been predicted to be positioned.

20 Claims, 11 Drawing Sheets

(56) References Cited

U.S. PATENT DOCUMENTS

2014/0350839 A1   11/2014  Pack
2017/0108867 A1*  4/2017  Franzius .............. G05D 1/0265
2021/0166426 A1*  6/2021  McCormac ............ G06T 7/251

* cited by examiner

US 11,254,002 B1

AUTONOMOUS ROBOTIC DEVICE

CROSS-REFERENCE TO RELATED APPLICATIONS

This application claims the benefit of Provisional Patent Application No. 62/644,772, filed Mar. 19, 2018, which is hereby incorporated by reference.

In this patent, certain U.S. patents, U.S. patent applications, or other materials (e.g., articles) have been incorporated by reference. Specifically, U.S. patent application Ser. Nos. 16/048,179, 16/048,185, 16/163,541, 16/163,562, 16/163,508, 16/185,000, 62/681,965, 62/614,449, 16/041,286, 15/406,890, 14/673,633, 16/163,530, 14/817,952, 16/198,393, 62/590,205, 62/740,558, 16/230,805, and Ser. No. 16/239,410 are hereby incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF THE DISCLOSURE

The disclosure relates to autonomous robotic devices.

BACKGROUND

Complex physical systems can be mathematically modeled to predict certain aspects of their functionality. Estimation of model parameters can have significant implications on the accuracy of the mathematical model predictions. For an autonomous robotic device, a mathematical model that can accurately predict the motion of the robotic device is essential for the robotic device to navigate and operate autonomously within an environment.

SUMMARY

The following presents a simplified summary of some embodiments of the techniques described herein in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Provided is a robotic device, including: a chassis; a set of wheels; one or more motors to drive the set of wheels; a controller in communication with the one or more motors; at least one sensor; a camera; one or more processors; a tangible, non-transitory, machine readable medium storing instructions that when executed by the one or more processors effectuate operations including: capturing, with the camera of the robotic device, spatial data of surroundings of the robotic device; generating, with the one or more processors of the robotic device, a movement path based on the spatial data of the surroundings; predicting, with the one or more processors of the robotic device, a new predicted state of the robotic device, the new predicted state including at least a predicted position of the robotic device, wherein predicting the new predicted state of the robotic device includes: capturing, with the at least one sensor of the robotic device, movement readings of the robotic device; predicting, with the one or more processors of the robotic device, the new predicted state of the robotic device using a motion model of the robotic device based on at least one of: a previous predicted state of the robotic device and the movement readings; and updating, with the one or more processors of the robotic device, the movement path to exclude locations of the movement path that the robotic device has previously been predicted to be positioned.

Included is a method for determining a movement path of a robotic device, including: capturing, with a camera of the robotic device, spatial data of surroundings of the robotic device; generating, with one or more processors of the robotic device, the movement path based on the spatial data of the surroundings; predicting, with the one or more processors of the robotic device, a new predicted state of the robotic device, the new predicted state including at least a predicted position of the robotic device, wherein predicting the new predicted state of the robotic device includes: capturing, with at least one sensor of the robotic device, movement readings of the robotic device; predicting, with the one or more processors of the robotic device, the new predicted state of the robotic device using a motion model of the robotic device based on at least one of: a previous predicted state of the robotic device, the movement readings, and model parameters; and updating, with the one or more processors of the robotic device, the movement path to exclude locations of the movement path that the robotic device has previously been predicted to be positioned.

DETAILED DESCRIPTION OF SOME EMBODIMENTS

Figure 1A:
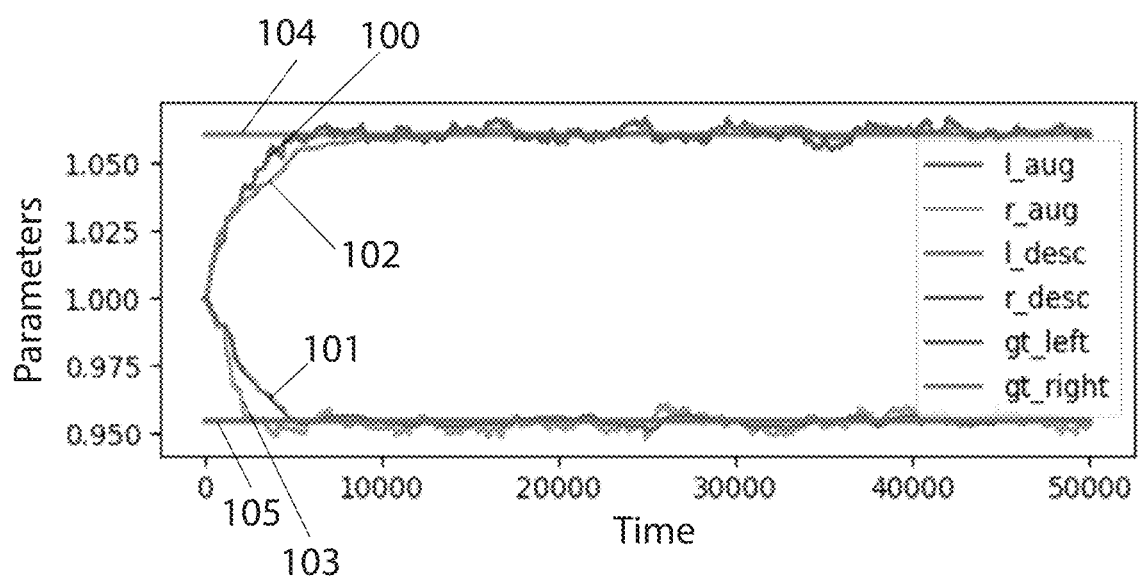
FIGS. 1A and 1B illustrate results of an exemplary method for estimating parameters of a motion model of a robotic device, according to some embodiments.

The present invention will now be described in detail with reference to a few embodiments thereof as illustrated in the accompanying drawings. In the following description, numerous specific details are set forth in order to provide a thorough understanding of the present inventions. It will be apparent, however, to one skilled in the art, that the present invention may be practiced without some or all of these specific details. In other instances, well known process steps and/or structures have not been described in detail in order to not unnecessarily obscure the present invention. Further, it should be emphasized that several inventive techniques are described, and embodiments are not limited to systems implanting all of those techniques, as various cost and engineering trade-offs may warrant systems that only afford a subset of the benefits described herein or that will be apparent to one of ordinary skill in the art.

Some embodiments include a robotic device having communication, an actuator, mobility, and/or processing elements. The robotic device may include a casing (like a shell), a chassis, a transport drive system such as wheels or other mobility device, a motor to drive the wheels or other mobility device, one or more cleaning tools, a receiver that acquires signals transmitted from, for example, a transmitting beacon, a processor, a controller, memory, network or wireless communications, power management, etc., and one or more clock or synchronizing devices. The robotic device may also include a power module for delivering (and in some cases storing) electrical power and a sensor module for observing the environment and for sending commands based on the observed environment. The sensor module may include sensors for detecting obstacles, types of flooring, cliffs, system status, temperature, and the like or sensors for measuring movement. An interface module may also be included to provide an interface between the robotic device and a user. The robotic device may further include IR sensors, tactile sensors, sonar sensors, gyroscopes, ultrasonic range finder sensors, depth sensing cameras, odometer sensors, optical flow sensors, LIDAR, LADAR, cameras, IR illuminator, remote controls, Wi-Fi capability, network card, Bluetooth capability, cellular functionality, USB ports and RF transmitter/receiver. Other types of robots or robotic devices with other configurations may also be used and implement the techniques described herein.

In some embodiments, the processor of the robotic device generates a map of the environment, while in other embodiments, the map is provided in the memory of the robotic device. For example, in some embodiments, the processor discovers and plots the perimeter of the environment by combining readings taken within successively overlapping fields of view using a camera. In some embodiments, an image processor (e.g., an on-board image processor) processes the captured images. In some embodiments, distance measurements are taken within successively overlapping fields of view using the camera as the robotic device moves within the environment and overlapping distance measurements are combined by the processor to plot the perimeter of the environment. In some embodiments, the processor compares the distance measurements taken within consecutive fields of view to find the overlapping area between successive images. In some embodiments, the processor determines an area of overlap between two fields of view when a number of consecutive measurements from a first field of view and a second field of view are similar. In some embodiments, the area of overlap between distance measurements taken within two fields of view is estimated based on the measured movement of the robotic device and is used as a method of verifying the identified area of overlap. It may also be used as the primary method of identifying the area of overlap. In some embodiments, devices such as an odometer, gyroscope, and optical flow sensor are used to measure movement. For example, the angular displacement provided by an odometer and gyroscope and/or the mathematical convolution of the two are used to estimate the area of overlap. In some embodiments, the processor identifies gaps in the plotted perimeter and further explores the identified gaps, directing the camera until a complete (or more complete) closed loop perimeter of the environment is plotted. In some embodiments, the robotic device starts working in the discovered environment while trying to discover new areas. Detailed examples of methods for creating a map of an environment are described in U.S. patent application Ser. Nos. 16/048,179, 16/048,185, 16/163,541, 16/163,562, 16/163,508, 16/185,000, 62/614,449, and 62/681,965, the entire contents of which are hereby incorporated by reference.

For example, in some embodiments, a camera, installed on the robotic device perceives depths from the camera to objects within a first field of view, e.g., such that a depth is perceived at each specified increment. In some embodiments, the robotic device and attached camera rotate to observe a second field of view partly overlapping the first field of view. In some embodiments, the processor compares the depths for the second field of view to those of the first field of view and identifies an area of overlap when a number of consecutive depths from the first and second fields of view are similar, as determined with techniques such those described below. Once an area of overlap is identified, in some embodiments, the processor uses the area of overlap as the attachment point and attaches the two fields of view to form a larger field of view. The method of using the camera to perceive depths within consecutively overlapping fields of view and the processor to identify the area of overlap and combine perceived depths at identified areas of overlap is repeated, e.g., until all areas of the environment are discovered and a map is constructed.

The robotic device may, for example, use the map to autonomously navigate the environment during operation, e.g., accessing the map to determine that a candidate route is blocked by an obstacle denoted in the map, to select a route with a route-finding algorithm from a current point to a target point, or the like. In some embodiments, the map is stored in memory for future use. Storage of the map may be in temporary memory such that a stored map is only available during an operational session or in more permanent forms of memory such that the map is available at the next session or startup. In some embodiments, the map is further processed to identify rooms and other segments. In some embodiments, a new map is constructed at each use, or an extant map is updated based on newly acquired data Some embodiments may reference previous maps during subsequent mapping operations. For example, embodiments may apply Bayesian techniques to simultaneous localization and mapping and update priors in existing maps based on mapping measurements taken in subsequent sessions.

In some embodiments, the robotic device moves while scanning a surrounding environment using a device capable of measuring depth or data from which depth can be inferred. In some embodiments, the processor of the robotic device creates an initial low-resolution map of environment using a subset of the scans. In some embodiments, the processor initially assumes the robotic device is located somewhere within an area greater than the size of the robotic device. The processor reduces the size of area when data is collected and increases the size of the area when the robotic device moves. As the robotic device moves the processor adjusts the shape of the area based on deviation between the measured and true heading and translation of the robotic device. In some embodiments, the processor assigns a likelihood of the robotic device being located at each possible location of the robotic device within the area.

In some embodiments, the robotic device autonomously cleans an area using one or more cleaning tools, such as brushes, a UV sterilizer, or a mop. In some embodiments, the processor determines which cleaning tools to use based on characteristics of the environment using methods such as those described in U.S. patent application Ser. No. 16/239,410 and Ser. No. 16/163,530, the entire contents of which are hereby incorporated by reference. For example, in some embodiments, the robotic device uses the processor and one or more environmental sensors (e.g., sensors that sense attributes or can observe or provide data from which inferences can be made about characteristics of an environment, such as those of a floor, a wall, or a surface of an obstacle). Examples of sensors include, but are not limited to, floor sensors, debris sensors, obstacle sensors, cliff sensors, acoustic sensors, cameras, optical sensors, distance sensors, motion sensors, tactile sensors, electrical current sensors, and the like. Sensors may sense various attributes of one or more of these features of an environment, e.g., particulate density, rolling resistance experienced by robot wheels, hardness, location, carpet depth, sliding friction experienced by robot brushes, hardness, color, acoustic reflectivity, optical reflectivity, planarity, acoustic response of a surface to a brush, and the like. In some embodiments, the sensor takes readings of the environment and the processor obtains the sensor data. In some embodiments, the sensed data is associated with location data of the robotic device indicating the location of the robotic device at the time the sensor data was obtained. In some embodiments, the processor infers environmental characteristics from the sensory data. In some embodiments, the processor adjusts various operating parameters of actuators, like speed, torque, duty cycle, frequency, slew rate, flow rate, pressure drop, temperature, brush height above the floor, or second or third order time derivatives of the same. For instance, some embodiments adjust the speed of components (e.g., main brush, peripheral brush, wheel, impeller, etc.) based on the environmental characteristics inferred. In some embodiments, the processor activates or deactivates (or modulates intensity of) functions (e.g., vacuuming, mopping, UV, etc.) based on the environmental characteristics inferred. In other instances, the processor adjusts a cleaning path, operational schedule (e.g., time when various designated areas are worked upon, such as when cleaned), and the like based on sensory data. Examples of environmental characteristics include floor type, obstacle density, room type, level of debris accumulation, level of user activity, time of user activity, etc.

In some embodiments, the processor of the robotic device determines a movement path of the robotic device based on the map of the commercial establishment. For example, in some embodiments, the robotic device is configured to implement a path planning method that is responsive to stimulus from an observed environment using the processor of the robotic device. Some embodiments segment a working environment into regions and then dynamically adjust a coverage pattern within each of those regions abased on sensed attributes of the environment. In some embodiments, a topological graph represents the route plan of the robotic device and is described with a set of vertices and edges, the vertices being linked by edges. Vertices may be represented as distinct points while edges may be lines, arcs or curves. The properties of each vertex and edge may be provided as arguments at run-time based on real-time sensory input of the environment. The topological graph may define the next actions of the robotic device as it follows along edges linked at vertices. While executing the movement path, in some embodiments, rewards may be assigned as the robotic device takes actions to transition between states and uses the net cumulative reward to evaluate a particular movement path comprised of actions and states. The processor may iteratively calculate a state-action value function during execution of the movement path based on the current reward and maximum future reward at the next state. One goal is to find optimal state-action value function and optimal policy by identifying the highest valued action for each state. As different topological graphs including vertices and edges with different properties are executed over time, the number of states experienced, actions taken from each state, and transitions increase. The path devised by the processor of the robotic device iteratively evolves to become more efficient by choosing transitions that result in most favorable outcomes and by avoiding situations that previously resulted in low net reward. After convergence, the evolved movement path is determined to be more efficient than alternate paths that may be devised using real-time sensory input of the environment. Detailed examples of path planning methods are described in U.S. patent application Ser. Nos. 16/041,286, 15/406,890, and Ser. No. 14/673,633, the entire contents of which are hereby incorporated by reference.

In some embodiments, the processor divides the environment into subareas and orders them for cleaning to improve cleaning efficiency. In some embodiments, the robotic device finishes cleaning in one subarea before cleaning another subarea. For example, in some embodiments, the processor divides the map into a plurality of cells wherein each cell corresponds to an area of the environment. In some embodiments, the processor segments the map into a plurality of zones, each zone having a subset of the plurality of cells. In some embodiments, the processor determines a sequence of the zones among a plurality of candidate sequences based on an effect of the sequence on a cost of a cost function that is based on travel distance of the robotic device through the sequence. In some embodiments, the robotic device traverses the zones in the determined sequence. In some embodiments, the cost function is based on other variables, such as actual surface coverage, repeat coverage, and total coverage time. Detailed examples of methods for dividing an environment into subareas are described in U.S. patent application Ser. Nos. 14/817,952, 16/198,393, 62/590,205, and 62/740,558, the entire contents of which are hereby incorporated by reference.

In some embodiments, the processor of the robotic device uses a motion model to predict the position of the robotic device within the environment. In some embodiments, the processor determines parameters of the motion model of the robotic device that improve predictions of the motion model. In some embodiments, the processor uses a parametrized model $\hat{y}_{t+1}=\text{model}(y_t,p_t)$ to predict output $\hat{y}_{t+1}$ at time t+1 given observed output $y_t$ at time t and parameters $p_t$. In some embodiments, the processor estimates the parameters that minimize a prediction error $y_{t+1}-\hat{y}_{t+1}$, wherein $y_{t+1}$ is the actual observed output at time t+1. In some embodiments, the processor uses recursive estimation $p_{t+1}=p_t+K_{t+1}(y_{t+1}-\hat{y}_{t+1})$ to estimate parameter $p_{t+1}$ at time t+1. In some embodiments, the processor uses the gain $K_{t+1}$ to determine how much the current prediction error $y_{t+1}-\hat{y}_{t+1}$ affects the update of the parameter estimate. In some embodiments, the processor updates the parameter in the direction of the gradient of the error by, for example, $K_{t+1}=Q_{t+1}\Psi_{t+1}$ with $Q_{t+1}$ suitably chosen, and the gradient $$\Psi_{t+1}^T = \frac{\partial \hat{y}_{t+1}}{\partial p_t},$$

wherein $Q_{t+1}$ is a weighting factor used to determine how much to correct the parameter estimate. In some embodiments, the processor uses tracking error gradient descent wherein $Q_{t+1}$=constant. In some embodiments, the processor uses tracking error gradient descent with normalized gradient wherein $$Q_{t+1} = \frac{\gamma}{\|\Psi_{t+1}\|^2 + \text{Bias}},$$

wherein $\gamma$ is a constant. In some embodiments, $Q_{t+1}$ is chosen as a forgetting factor. In some embodiments, $K_{t+1}$ is chosen as Kalman gain of a Kalman filter.

In some embodiments, the processor of the robotic device predicts where the robotic device is going to be positioned $\hat{x}_{t+1}$=model $(x_t, u_t, \Delta t)$ at time t+1 given an input state $x_t$ (i.e., previous position estimate) and sensor measurements $u_t$ (e.g., wheel encoder) at time t and a time step $\Delta t$. In some embodiments, the processor implements the model in a Kalman filter and the prediction step is an explicit Euler step in time. In some embodiments, the processor receives feedback on the computed state estimate (e.g., through sensor pose updates) and corrects the pose to $x_{t+1}$ at time t+1. In some embodiments, the processor determines a tracking error using $e=x_{t+1}-\hat{x}_{t+1}$.

In some embodiments, the processor uses tracking error gradient descent to reduce the tracking error. In some embodiments, the processor adds parameters to the model $\hat{x}_{t+1}$=model $(x_t, u_t, \Delta t, p_t)$ to improve the performance of the model. Examples of parameters include wheel radii, wheel distance, sensor position, etc. In some embodiments, the processor incrementally perturbs the parameters in the direction that reduces the tracking error the most, or otherwise in the direction of the descent on the tracking error function $E=\frac{1}{2}e^T e$. In some embodiments, the processor updates the parameters using $$p_{t+1} = p_t + h \left(\frac{\partial \hat{x}_{t+1}}{\partial p_t}\right)^T e,$$

where h is a small step size. This is the same update rule as described above with $Q_{t+1}$=h and $$\Psi_{t+1}^T = \frac{\partial \hat{x}_{t+1}}{\partial p_t}.$$

In some embodiments, the processor uses hyperparameters for fine tuning the model. In some embodiments, the processor uses an adaptive step size h(t), wherein $$Q_{t+1} = \frac{\gamma}{\|\Psi_{t+1}\|^2 + \text{Bias}},$$

for example. In some embodiments, the processor models uncertainty by premultiplying Q with a matrix M to, for example, do larger updates in directions with higher certainty and smaller updates in directions of uncertainty, or by taking the Kalman update instead as it is already corrected by both covariance matrices. In some embodiments, the processor improves stability of the model by, for example, detecting outliers and eliminating them or by delayed updates, or by delayed updates on a separate set of parameters.

In some embodiments, the processor uses an extended Kalman filter with augmented state space in modeling the motion of the robotic device. In some embodiments, the processor uses the augmented state space $$\tilde{x}_t = \begin{pmatrix} x_t \\ p_t \end{pmatrix}$$

and applies the Kalman filter to $\tilde{x}$. In some embodiments, the parameters are taken as time-invariant and the processor models zero noise on the parameter portion of the state. Therefore, in some embodiments, the processor models dynamics using $$\tilde{x}_{t+1} = \tilde{\Phi}(\ldots) = \begin{pmatrix} \text{model}(x_t, u_t, \Delta t, p_t) \\ p_t \end{pmatrix}.$$

In some embodiments, the processor updates the Jacobian F from the non-augmented Kalman process using $$\tilde{F} = \frac{\partial \tilde{\Phi}}{\partial \tilde{x}_t} = \begin{pmatrix} F & \Psi_{t+1}^T \\ 0 & I \end{pmatrix},$$

wherein $\Psi_{t+1}^T$ is the model derivative with respect to the parameters as defined above.

For example, in some embodiments, the processor models motion of the robotic device using $\dot{x}=v \cos \omega$; $\dot{y}=v \sin \omega$; $\dot{\theta}=\omega$, with initial conditions such as $x(t_0)=x_0$, and wherein v is translational velocity and $\omega$ is rotational velocity. In some embodiments, the processor uses a forward model including $x_{t+1}=x_t+v\Delta t \cos \theta_t$; $y_{t+1}=y_t+v\Delta t \sin \theta_t$; $\theta_{t+1}=\theta_t+\omega\Delta t$, to compute the motion of the robotic device. In some embodiments, the processor determines translational and rotational velocities v and $\omega$ based on observed right and left wheel velocities $\omega_R$ and $\omega_L$ of the robotic device using $$\begin{pmatrix} v \\ \omega \end{pmatrix} = J \begin{pmatrix} \omega_L \\ \omega_R \end{pmatrix},$$

wherein $$J = \begin{pmatrix} r_L/2 & r_R/2 \\ -r_L/b & r_R/b \end{pmatrix}$$

and $r_R$ and $r_L$ are right and left wheel radii and b is the distance between the right and left wheels. In some embodiments, the processor uses wheel sizes as parameters $p_t=|r_L, r_R|^T$ and $J=J(p_t)$. In some embodiments, the processor estimates parameters p for observed left and right wheel velocities $u_t=|\omega_L, \omega_R|^T$ to improve the forward model. Given abbreviated state vector $$x_t = \begin{pmatrix} x_t \\ y_t \\ \theta_t \end{pmatrix},$$

the processor uses forward model $$\hat{x}_{t+1} = \text{model}(x_t, u_t, \Delta t, p_t) = \begin{pmatrix} x_t + v_t \Delta t \cos\theta_t \\ y_t + v_t \Delta t \sin\theta_t \\ \theta_t + \omega_t \Delta t \end{pmatrix}$$

with $$\begin{pmatrix} v_t \\ \omega_t \end{pmatrix} = J(p_t) u_t.$$

In some embodiments, the processor determines the gradient for a single time step in the direction of the model parameters using $$\Psi_{t+1}^T = \frac{\partial \hat{x}_{t+1}}{\partial p_t} = \frac{1}{2} \Delta t \begin{pmatrix} \omega_L \cos\theta_t & \omega_R \cos\theta_t \\ \omega_L \sin\theta_t & \omega_R \sin\theta_t \\ -2\omega_L/b & 2\omega_R/b \end{pmatrix}.$$

In some embodiments, the processor updates parameters $p_t$ in the direction of steepest descent of a single time step error function. In some embodiments, upon receiving a scan match the processor estimates the position of the robotic device using EKF before the scan match and the position of the robotic device based on the scan match. In some embodiments, the processor determines an error $e_{t+1}$=pose from scan match−pose from EKF before scan match and uses the error to update the parameters $p_{t+1} = p_t + Q_{t+1} \Psi_{t+1} e_{t+1}$.

Figure 1B:
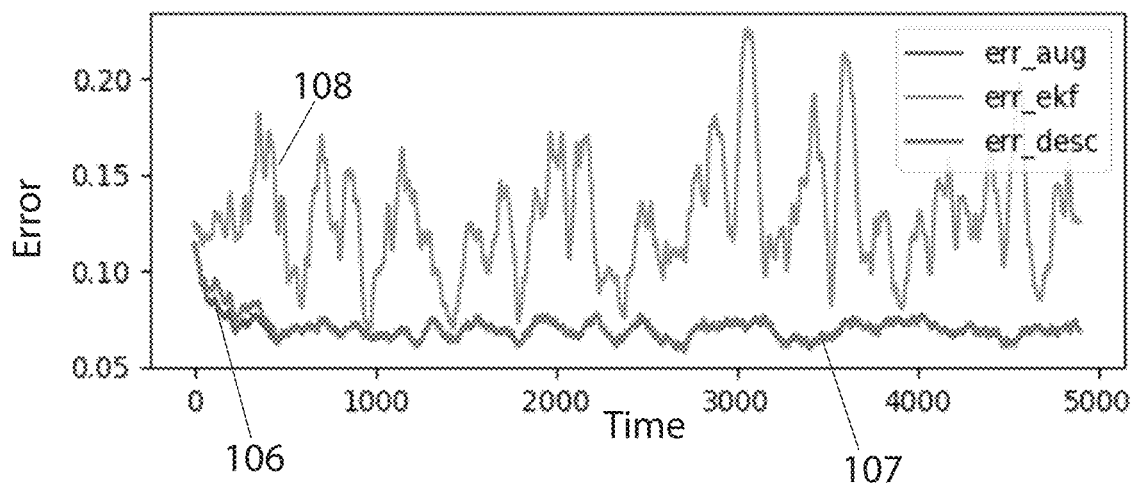

FIG. 1A illustrates estimated left and right wheel parameters for augmented Kalman filter 100 and 101 and tracking error gradient descent 102 and 103 based on simulated data with Gaussian noise. Ground truth of left and right wheel parameters 104 and 105 are also plotted. FIG. 1B illustrates the resulting error in pose for augmented Kalman filter 106, tracking error gradient descent 107, and classic Kalman filter 108. Both augmented Kalman filter and tracking error gradient descent perform better than classic Kalman filter.

Figure 2A:
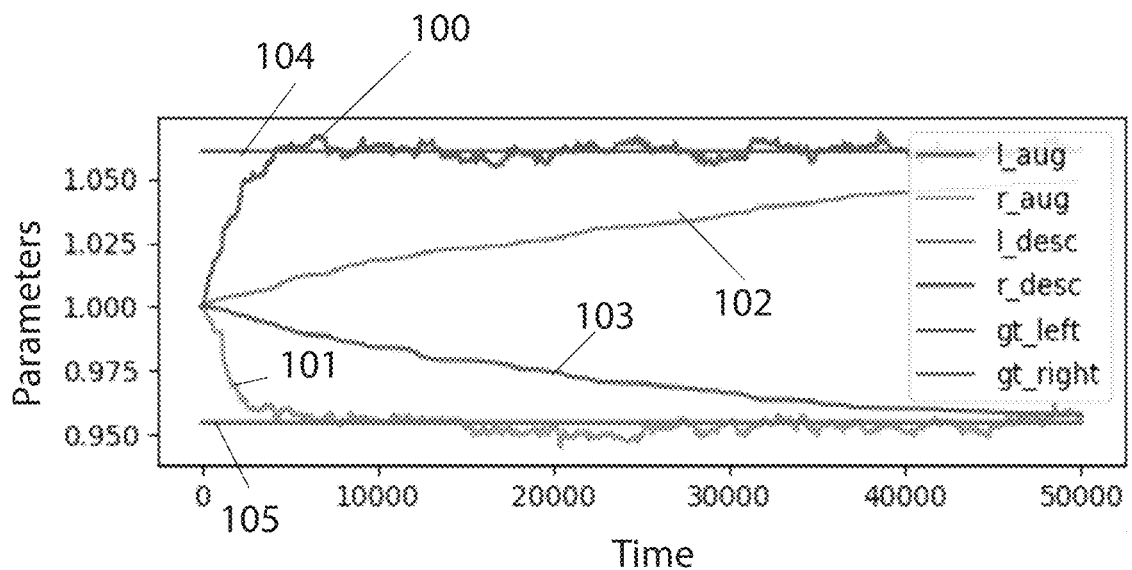
FIGS. 2A and 2B illustrate results of an exemplary method for estimating parameters of a motion model of a robotic device, according to some embodiments.
Figure 2B:
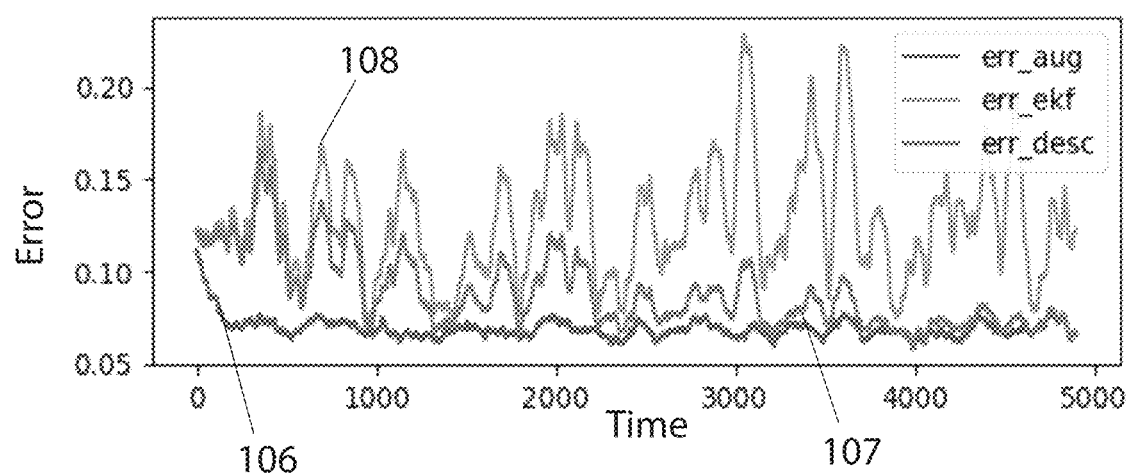

FIGS. 2A and 2B are the same as FIGS. 1A and 1B, respectively, however a smaller step size is used for tracking error gradient descent. This is evident as left and right wheel parameters estimated using tracking error gradient descent 102 and 103 approach ground truth 104 and 105 much slower, which is reflected in the resulting error of tracking error gradient descent 107.

Figure 3A:
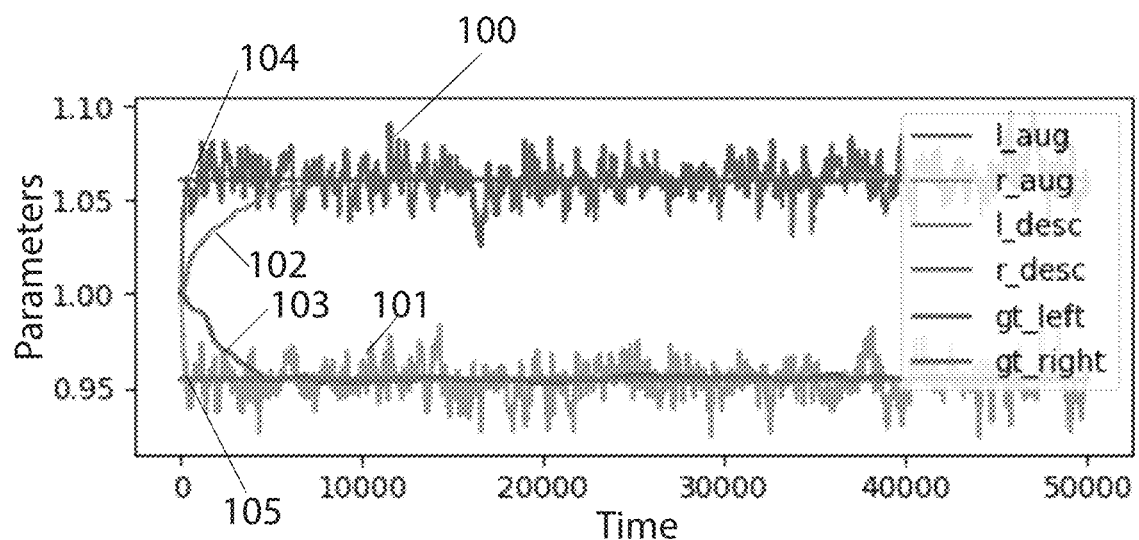
FIGS. 3A and 3B illustrate results of an exemplary method for estimating parameters of a motion model of a robotic device, according to some embodiments.
Figure 3B:
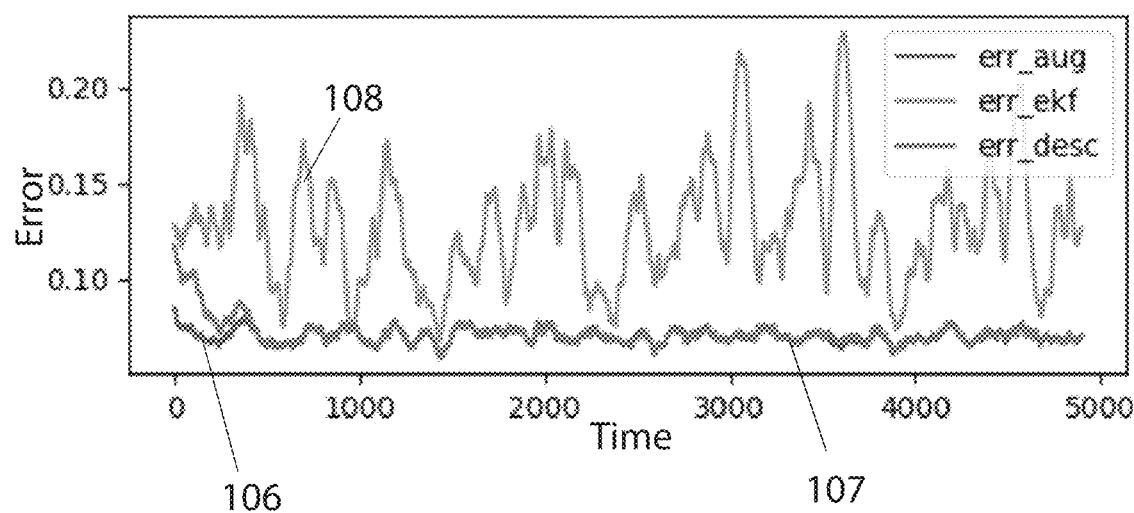

FIGS. 3A and 3B are the same as FIGS. 1A and 1B, respectively, however a higher noise for the left and right wheel parameter is adding in the augmented Kalman filter. This results in noisier parameter estimates for the augmented Kalman filter 100 and 101.

Figure 4A:
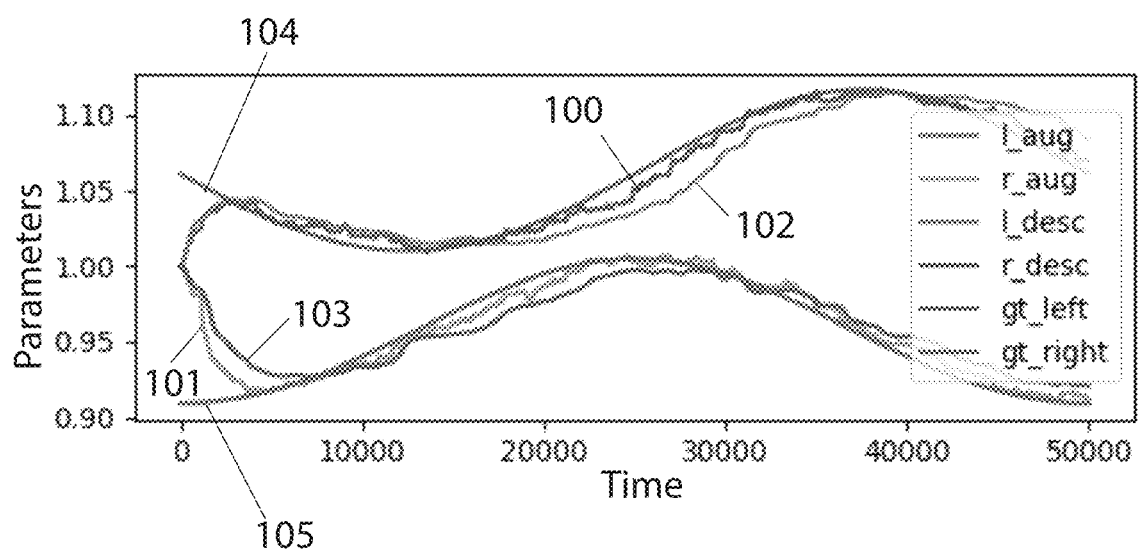
FIGS. 4A and 4B illustrate results of an exemplary method for estimating parameters of a motion model of a robotic device, according to some embodiments.
Figure 4B:
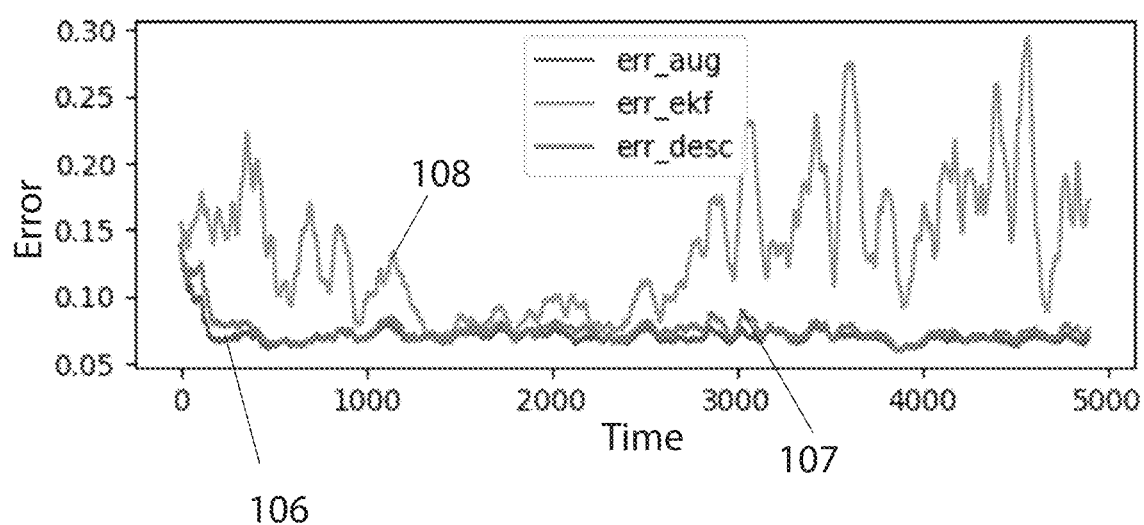

FIGS. 4A and 4B are the same as FIGS. 1A and 1B, respectively, however time variant left and right wheel parameters are used. Both augmented Kalman filter parameter estimates 100 and 101 and tracking error gradient descent parameter estimates 102 and 103 tracked changes in left and right wheel parameters 104 and 105.

Figure 5A:
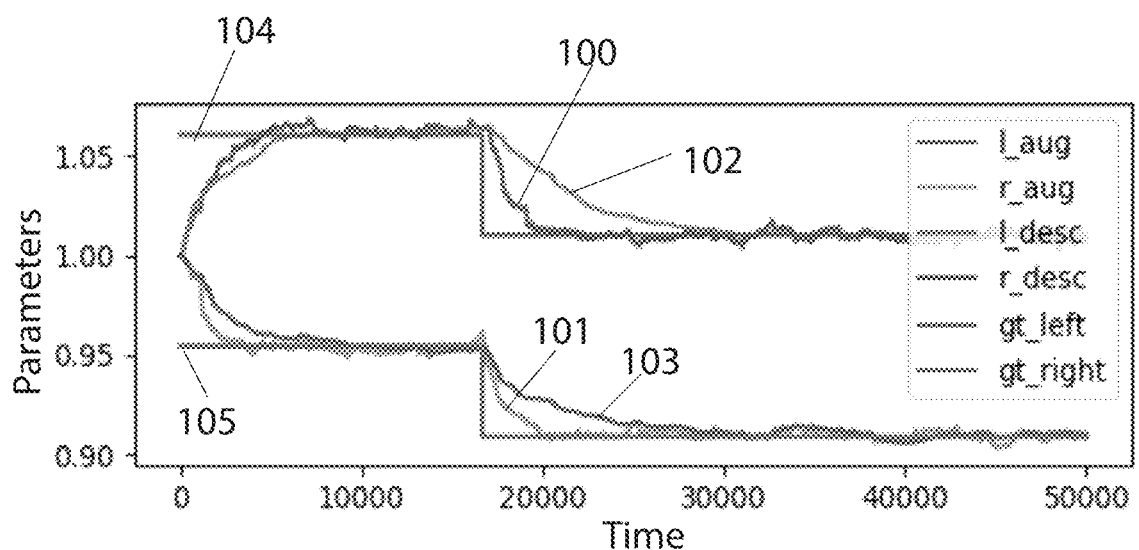
FIGS. 5A and 5B illustrate results of an exemplary method for estimating parameters of a motion model of a robotic device, according to some embodiments.
Figure 5B:
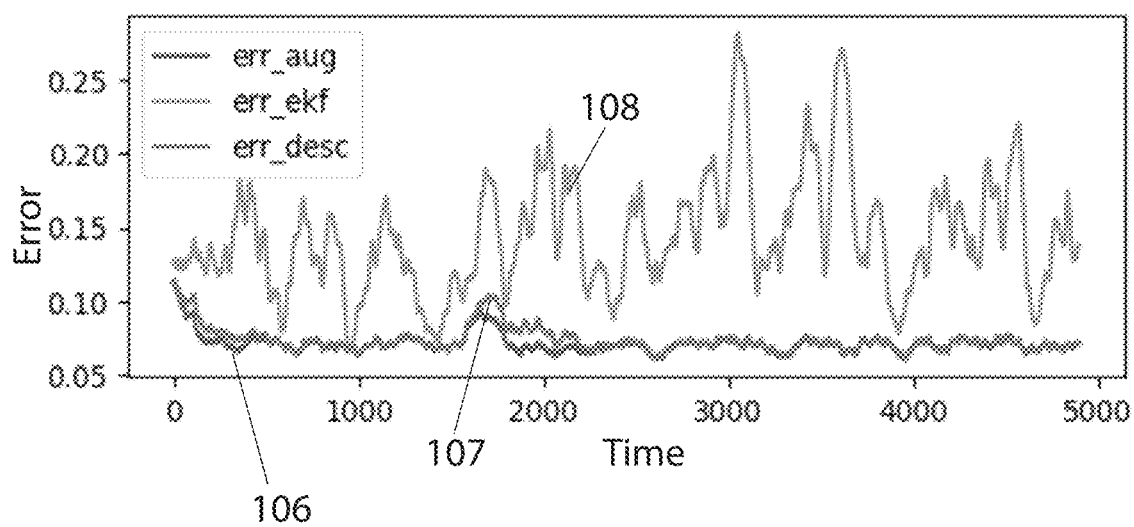

FIGS. 5A and 5B are the same as FIGS. 1A and 1B, respectively, however a drop in left and right wheel parameter is added. Both augmented Kalman filter parameter estimates 100 and 101 and tracking error gradient descent parameter estimates 102 and 103 quickly accounted for the drop in left and right wheel parameter resulting in minimal jump in error 106 and 107 for augmented Kalman filter and tracking error gradient descent, respectively.

In some embodiments, the processor uses deep neural networks to learn complex, non-linear functions. In some embodiments, the deep neural networks recognize patterns by clustering and classifying data. In some embodiments, the neural networks establish correlations between the input data. In some embodiments, the processor uses feedforward networks to learn a motion model for the robotic device. In some embodiments, different hierarchy and training process are used to construct different possible motion models. For example, a first motion model uses previous pose and measure velocity to determine new pose. The first motion model takes position into account and is therefore capable of mapping coordinate dependent parameters (e.g., slightly tilted floor). In another example, a second motion model uses initial position and measured velocity to determine change in pose. The second motion model does not take position into account and therefore can only account for internal/general mismatches. Neither model 1 or 2 take previous velocities into account. In embodiments, previous velocities could be added but would increase the dimension of the neural network. While neural networks can be trained to a high degree of accuracy, they do not take previous measurements into account. Further, there is the challenge of online calibration with neural networks as calibration requires frequently running backpropagation. Depending on the size of the network, this can result in significant computational cost. Freezing the network and only updating the network with respect to a few parameters (e.g. additional tuning input parameters) may be considered conceptually similar to the methods described above.

Figure 6:
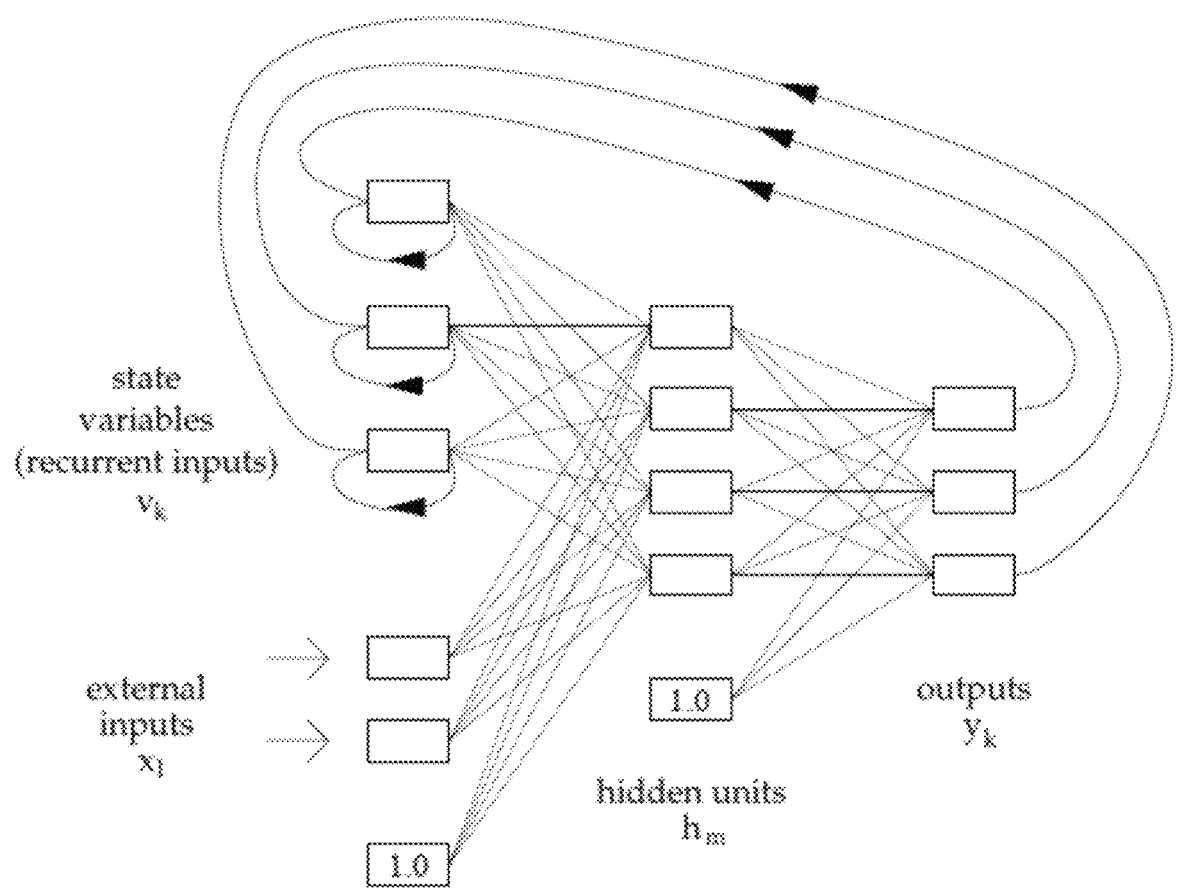
FIG. 6 illustrates an example hierarchy of a recurrent neural network, according to some embodiments.

In some embodiments, the processor uses a recurrent neural network as it is a time-aware type of neural network. Recurrent neural networks are able to keep states hidden from time step to time step. In contrast to feedforward neural networks, the input of recurrent neural networks includes not only the current input but also information perceived in previous steps. Internally, recurrent units have an internal state. This internal state also influences the output. With each input, this hidden state is updated. This mechanism provides a feedback loop at every time step in the input series. In some embodiments, the processor uses continuous time recurrent neural networks to account for slight mismatch in sampling speed of velocities. Different recurrent neural network hierarchies for modeling dynamics of the robotic device can be used. In some embodiments, the recurrent neural network feeds back the output from one time step as input to the next time step. For example, FIG. 6 illustrates a recurrent neural network hierarchy wherein part of the output is fed back to the state variables (recurrent inputs).

Figure 7:
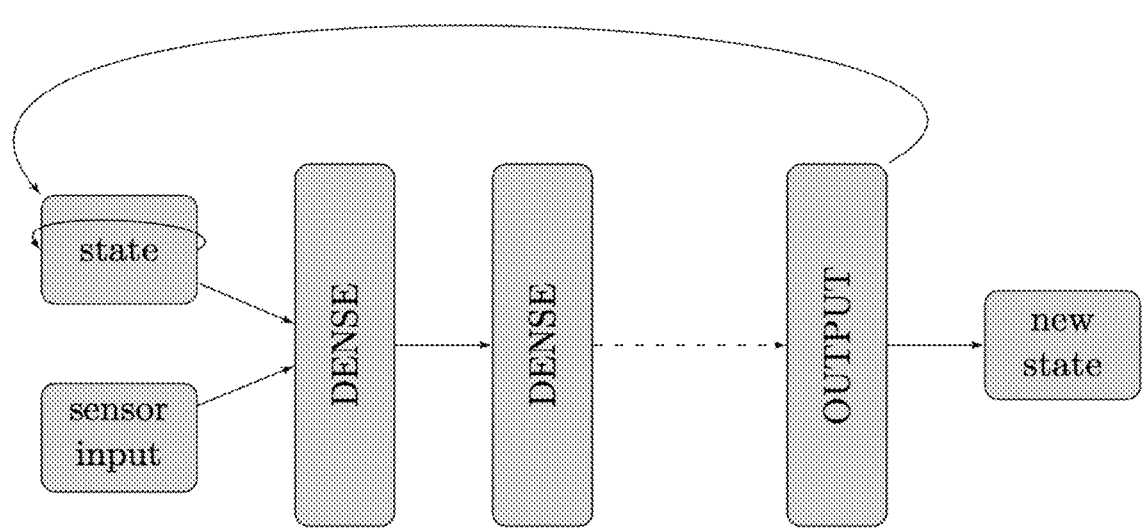
FIG. 7 illustrates an example of a motion model of a robotic device, according to some embodiments.

In some embodiments, the processor uses a time integration recurrent neural network to estimate a new state of the robotic device. In one embodiment, the recurrent neural network receives state and sensor measurements as input and outputs a new state and feeds back the output as the state input. This recurrent neural network is illustrated in FIG. 7. In another embodiment, the recurrent neural network outputs how much the state changed and the change is fed back and added to the state input. In some embodiments, the model is updated by backpropagating the error. In some embodiments, the error is backpropagated using iterative closest point matching.

Figure 8:
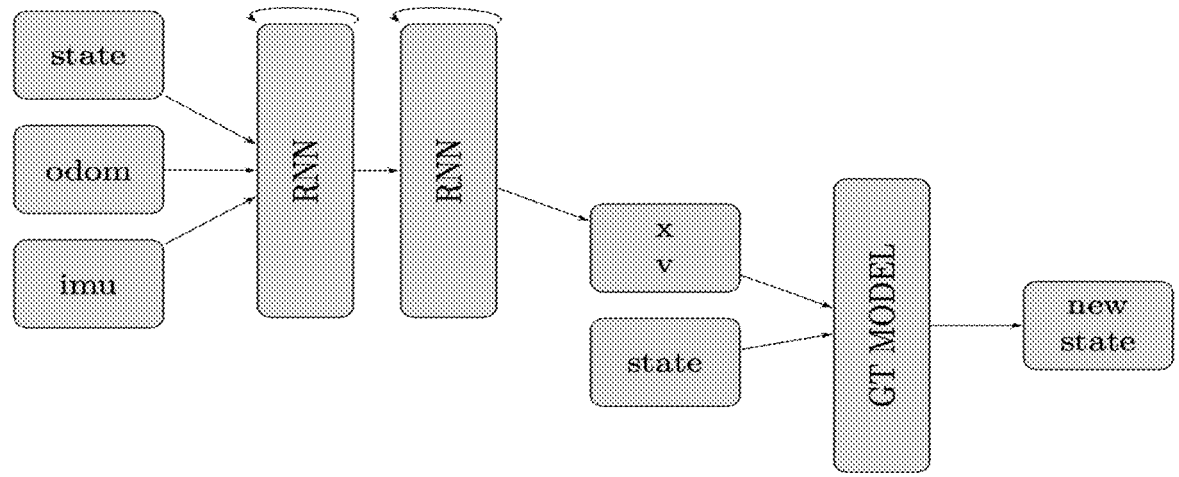
FIG. 8 illustrates an example of a motion model of a robotic device, according to some embodiments.

In some embodiments, the processor uses a modular structure to estimate a new state of the robotic device wherein the recurrent neural network receives state, odometer (odom) measurements and inertial measurement unit (IMU) readings as input and the output position (x) and velocity (v) of the recurrent neural network (RNN) is used input into a non-linear ground-truth (GT) model (e.g., classical motion model), in addition to state, describing physics of the robotic device. The GT model outputs a new state. This modular structure is illustrated in FIG. 8. In some embodiments, the processor updates the model by determining the hard-coded gradient of the ground truth model and directly backpropagating the gradient through the recurrent neural network.

Figure 9:
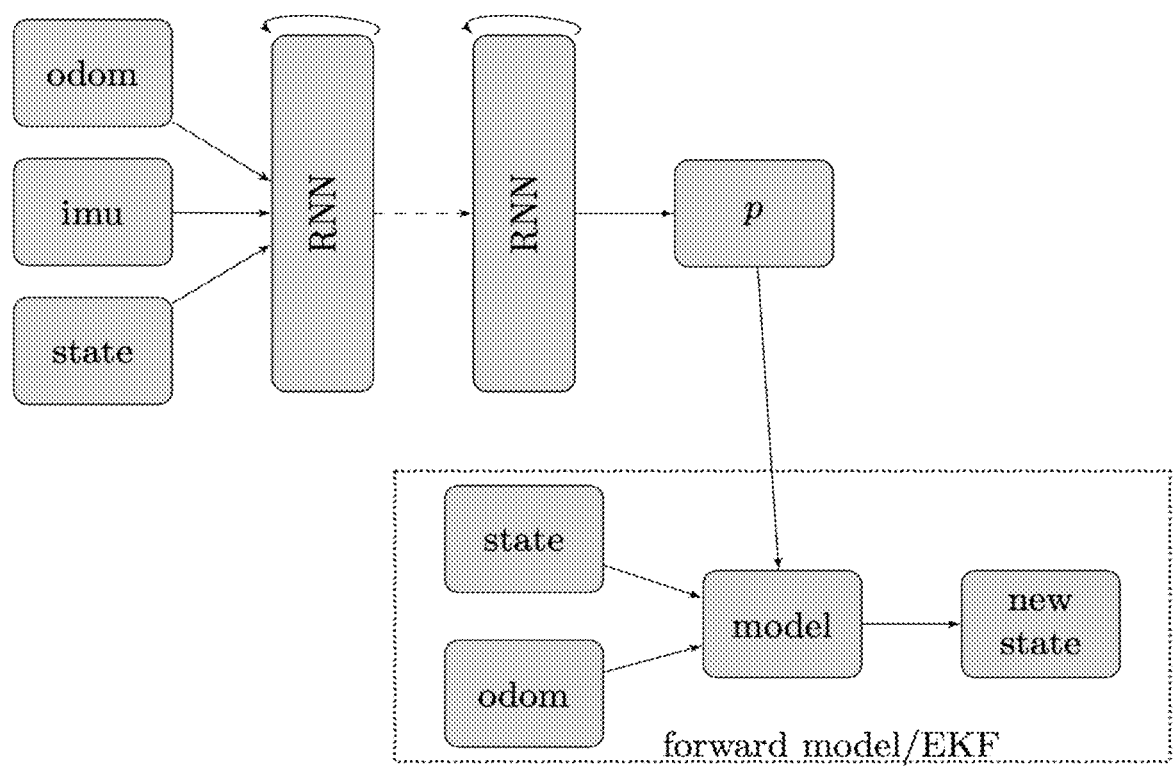
FIG. 9 illustrates an example of a motion model of a robotic device, according to some embodiments.

In some embodiments, the processor estimates a new state of the robotic device by learning to map observations to parameters p of a forward model (e.g., as described above). The recurrent neural network receives state, odometer (odom) measurements, and IMU readings as input and outputs parameters p, which are received as input into the forward model. The forward model also receives state and odometer measurements as input and outputs a new state. This is illustrated in FIG. 9. In some embodiments, the processor uses $p_{t+1} = p_t + Q_{t+1} \Psi_{t+1} e_{t+1}$ as described above to determine parameters instead of the recurrent neural networks shown in FIG. 9.

Figure 10A:
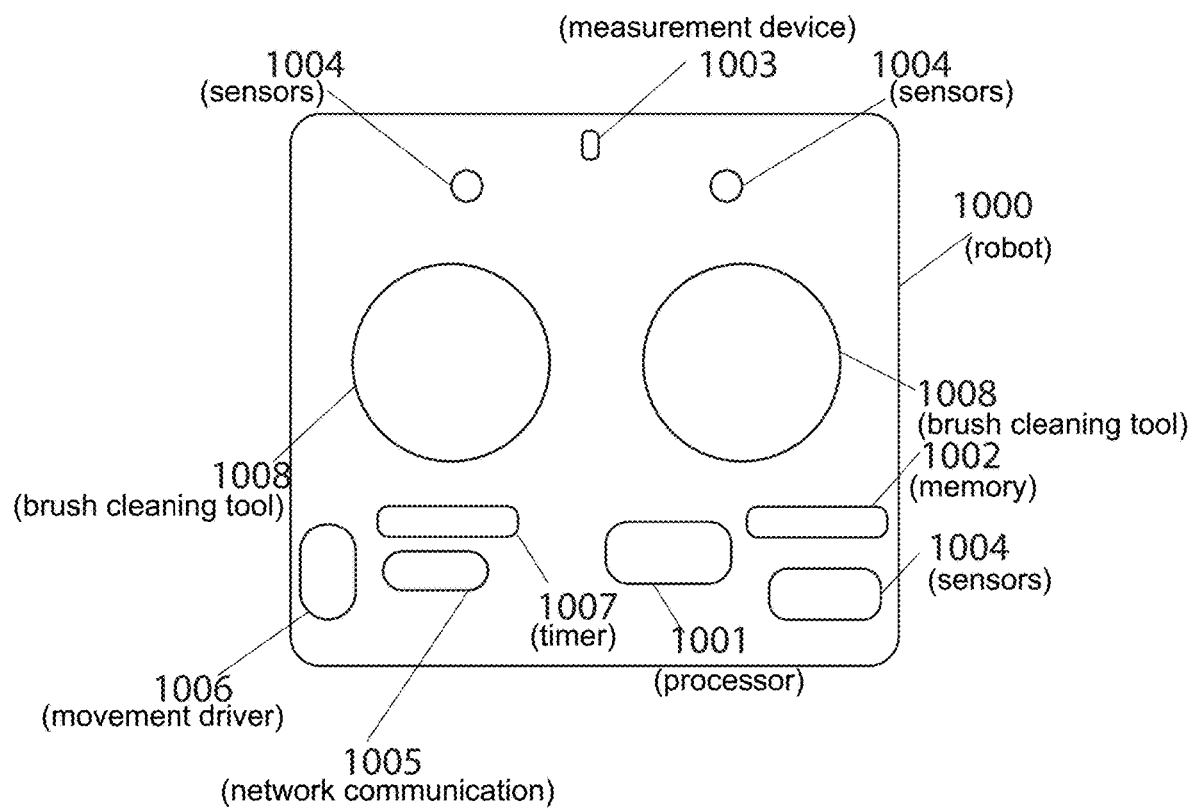
FIGS. 10A and 10B illustrate an example of a robotic device that may implement the techniques described herein, according to some embodiments.
Figure 10B:
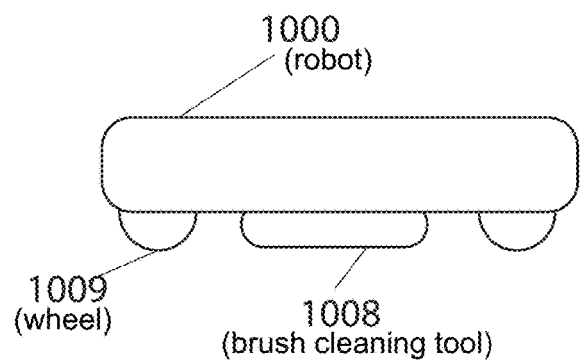

FIG. 10A illustrates a top view of an example of a robotic device 1000 with processor 1001, memory 1002, a measurement device 1003, a pair of sensors 1004, network communication 1005, movement driver 1006, timer 1007, and brush cleaning tools 1008. The first and second set of sensors 1003 and 1004 may include depth measuring devices, movement measuring devices (e.g., odometer, gyroscope, etc.), and the like. In some embodiments, the robotic device may include the features of a robotic device described herein. In some embodiments, program code stored in the memory 1002 and executed by the processor 1001 may effectuate the operations described herein. FIG. 10B illustrates a side view of the robotic device 1000 with wheels 1009 and a brush cleaning tool 1008. In some embodiments, the robotic device includes a customizable versatile mobile robotic chassis customized to function as a robotic device. An example of a customizable versatile mobile robotic chassis is described in U.S. patent application Ser. No. 16/230,805, the entire contents of which is hereby incorporated by reference.

Figure 11:
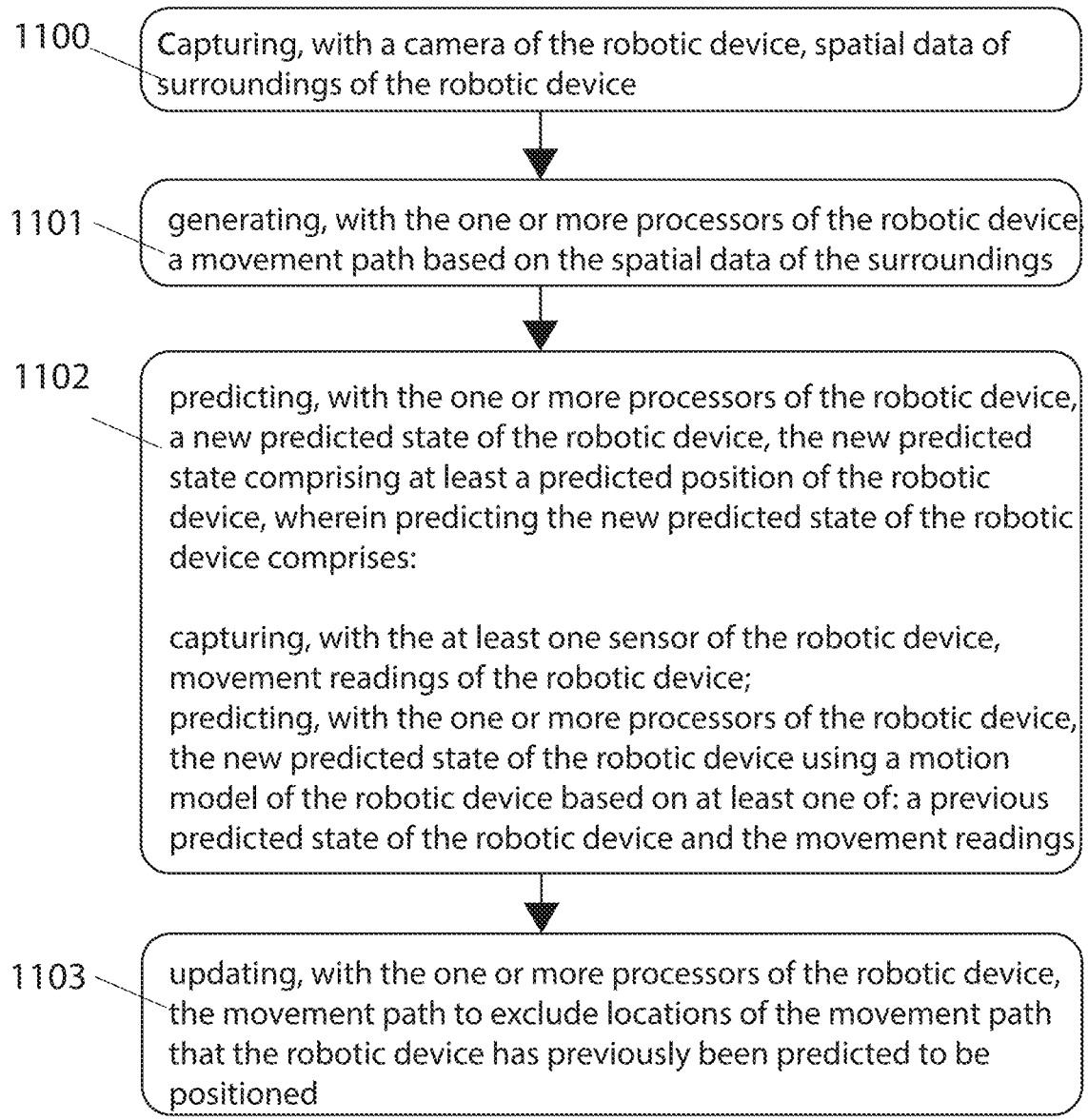
FIG. 11 illustrates a flowchart describing steps of a method for determining a movement path of a robotic device, according to some embodiments.

FIG. 11 illustrates a flowchart describing a method for determining a movement path of a robotic device including steps 1100, 1101, 1102, and 1103 corresponding with steps performed in some embodiments.

In other embodiments, the techniques described herein are applied to different types of robotic devices. Examples of robotic devices on which the techniques described herein may be implement include a surface cleaning robot, a lawn mowing robot, a pizza delivery robot with an oven for baking the pizza in route, a grocery delivery robot, a shopping cart robot with a freezer compartment for frozen food, a fire proof first aid robot including first aid supplies, a defibrillator robot, a hospital bed robot, a pressure cleaner robot, a dog walking robot, a marketing robot, an airport luggage robot, an ATM machine robot, a snow plowing and salt spreading robot, a car washing robot, and a passenger transporting robot.

The foregoing descriptions of specific embodiments of the invention have been presented for purposes of illustration and description. They are not intended to be exhaustive or to limit the invention to the precise forms disclosed. Obviously, many modifications and variations are possible in light of the above teaching.

In block diagrams, illustrated components are depicted as discrete functional blocks, but embodiments are not limited to systems in which the functionality described herein is organized as illustrated. The functionality provided by each of the components may be provided by specialized software or specially designed hardware modules that are differently organized than is presently depicted; for example, such software or hardware may be intermingled, conjoined, replicated, broken up, distributed (e.g. within a data center or geographically), or otherwise differently organized. The functionality described herein may be provided by one or more processors of one or more computers executing specialized code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation.

The present techniques will be better understood with reference to the following enumerated embodiments:

1. A robotic device, comprising: a chassis; a set of wheels; one or more motors to drive the set of wheels; a controller in communication with the one or more motors; at least one sensor; a camera; one or more processors; a tangible, non-transitory, machine readable medium storing instructions that when executed by the one or more processors effectuate operations comprising: capturing, with the camera of the robotic device, spatial data of surroundings of the robotic device; generating, with the one or more processors of the robotic device, a movement path based on the spatial data of the surroundings; predicting, with the one or more processors of the robotic device, a new predicted state of the robotic device, the new predicted state comprising at least a predicted position of the robotic device, wherein predicting the new predicted state of the robotic device comprises: capturing, with the at least one sensor of the robotic device, movement readings of the robotic device; predicting, with the one or more processors of the robotic device, the new predicted state of the robotic device using a motion model of the robotic device based on at least one of: a previous predicted state of the robotic device and the movement readings; and updating, with the one or more processors of the robotic device, the movement path to exclude locations of the movement path that the robotic device has previously been predicted to be positioned.

2. The robotic device of embodiment 1, wherein the at least one sensor comprises at least one of: an odometer, an optical encoder, an inertial measurement unit, a gyroscope, and an imaging device.

3. The robotic device of embodiments 1-2, wherein a first recurrent neural network is used to learn the motion model of the robotic device and predict the new predicted state of the robotic device based on the learned motion model.

4. The robotic device of embodiment 3, wherein the first recurrent neural network receives the previous predicted state and the movement readings as input and outputs the new predicted state of the robotic device, and wherein the new predicted state is fed back and used as the previous predicted state input of the first recurrent neural network.

5. The robotic device of embodiment 3, wherein predicting the new predicted state of the robotic device further comprises: determining, by the one or more processors of the robotic device, a true position of the robotic device based on the spatial data of the surroundings; determining, by the one or more processors of the robotic device, a prediction error based on the true position of the robotic device and the new predicted position of the robotic device predicted using the motion model of the first recurrent neural network; and updating, by the one or more processors of the robotic device, the first recurrent neural network by backpropagating the error through the first recurrent neural network to reduce the prediction error of the first recurrent neural network.

6. The robotic device of embodiments 1-5, wherein the spatial data comprises at least one of: depth data and image data of the surroundings.

7. The robotic device of embodiments 1-6, wherein a second recurrent neural network receives the previous predicted state and the movement readings as input and outputs the predicted position and a predicted velocity of the robotic device, and wherein the motion model receives the predicted position, predicted velocity and the previous predicted state as input and outputs the new predicted state.

8. The robotic device of embodiment 7, wherein the motion model comprises a forward model of classic equations of motion.

9. The robotic device of embodiment 7, wherein predicting the new state of the robotic device further comprises: determining, by the one or more processors of the robotic device, the true position of the robotic device based on the spatial data of the surroundings; determining, by the one or more processors of the robotic device, a prediction error based on the true position of the robotic device and the mew predicted position of the robotic device predicted using the forward model of classic equations of motion; and updating, by the one or more processors of the robotic device, the second recurrent neural network by backpropagating the error through the second recurrent neural network to reduce the prediction error of the second recurrent neural network.

10. The robotic device of embodiments 1-9, wherein a third recurrent neural network receives the previous predicted state and the movement readings as input and outputs model parameters of the motion model, and wherein the motion model receives the model parameters, the previous predicted state and the movement readings as input and outputs the new predicted state.

11. The robotic device of embodiment 10, wherein predicting the new predicted state of the robotic device further comprises: determining, by the one or more processors of the robotic device, the true position of the robotic device based on the spatial data of the surroundings; determining, by the one or more processors of the robotic device, a prediction error based on the true position of the robotic device and the new predicted position of the robotic device predicted using the motion model; and updating, by the one or more processors of the robotic device, the third recurrent neural network by backpropagating the error through the third recurrent neural network to reduce the prediction error of the third recurrent neural network.

12. The robotic device of embodiments 1-11, wherein the motion model comprises at least one of: an extended Kalman filter with augmented state space and a forward model of classic equations of motion.

13. The robotic device of embodiments 1-12, wherein the motion model receives the previous predicted state, the movement readings, and model parameters as input and outputs the new predicted state.

14. The robotic device of embodiment 13, wherein predicting the new predicted state of the robotic device further comprises: determining, by the one or more processors of the robotic device, the true position of the robotic device based on the spatial data of the surroundings; determining, by the one or more processors of the robotic device, a prediction error based on the true position of the robotic device and the new predicted position of the robotic device predicted using the motion model; and updating, by the one or more processors of the robotic device, the model parameters based on the prediction error, such that the model parameters are perturbed in the direction which reduces the prediction error the most.

15. The robotic device of embodiment 14, wherein the model parameters are updated based on previous model parameters, the prediction error and at least one of: tracking error gradient descent, tracking error gradient descent with normalized gradient, forgetting factor, and Kalman gain.

16. A method for determining a movement path of a robotic device, comprising: capturing, with a camera of the robotic device, spatial data of surroundings of the robotic device; generating, with one or more processors of the robotic device, the movement path based on the spatial data of the surroundings; predicting, with the one or more processors of the robotic device, a new predicted state of the robotic device, the new predicted state comprising at least a predicted position of the robotic device, wherein predicting the new predicted state of the robotic device comprises: capturing, with at least one sensor of the robotic device, movement readings of the robotic device; predicting, with the one or more processors of the robotic device, the new predicted state of the robotic device using a motion model of the robotic device based on at least one of: a previous predicted state of the robotic device, the movement readings, and model parameters; and updating, with the one or more processors of the robotic device, the movement path to exclude locations of the movement path that the robotic device has previously been predicted to be positioned.

17. The method of embodiment 16, wherein the spatial data comprises at least one of: depth data and image data.

18. The method of embodiments 16-17, wherein predicting the new predicted state of the robotic device further comprises: determining, by the one or more processors of the robotic device, a true position of the robotic device based on the spatial data of the surroundings; determining, by the one or more processors of the robotic device, a prediction error based on the true position of the robotic device and the new predicted position of the robotic device predicted using the motion model; and updating, by the one or more processors of the robotic device, the model parameters based on the prediction error, such that the model parameters are perturbed in the direction which reduces the prediction error the most.

19. The method of embodiment 18, wherein the model parameters are updated based on previous model parameters, the prediction error and at least one of: tracking error gradient descent, tracking error gradient descent with normalized gradient, forgetting factor, and Kalman gain.

20. The method of embodiments 16-19, wherein the motion model comprises at least one of: an extended Kalman filter with augmented state space and a forward model of classic equations of motion.

We claim:

1. A method for determining a movement path of a robotic device, comprising:
capturing, with a camera of the robotic device, spatial data of surroundings of the robotic device;

generating, with one or more processors of the robotic device, the movement path based on the spatial data of the surroundings;

predicting, with the one or more processors of the robotic device, a new predicted state of the robotic device, the new predicted state comprising at least a predicted position of the robotic device, wherein predicting the new predicted state of the robotic device comprises:

capturing, with at least one sensor of the robotic device, movement readings of the robotic device;

predicting, with the one or more processors of the robotic device, the new predicted state of the robotic device using a motion model of the robotic device based on at least one of: a previous predicted state of the robotic device, the movement readings, and model parameters; and updating, with the one or more processors of the robotic device, the movement path to exclude locations of the movement path that the robotic device has previously been predicted to be positioned.

2. The method of claim 1, wherein the spatial data comprises at least one of: depth data and image data.

3. The method of claim 1, wherein predicting the new predicted state of the robotic device further comprises:

determining, by the one or more processors of the robotic device, a true position of the robotic device based on the spatial data of the surroundings;

determining, by the one or more processors of the robotic device, a prediction error based on the true position of the robotic device and the new predicted position of the robotic device predicted using the motion model; and updating, by the one or more processors of the robotic device, the model parameters based on the prediction error, such that the model parameters are perturbed in the direction which reduces the prediction error the most.

4. The method of claim 3, wherein the model parameters are updated based on previous model parameters, the prediction error and at least one of: tracking error gradient descent, tracking error gradient descent with normalized gradient, forgetting factor, and Kalman gain.

5. The method of claim 1, wherein the motion model comprises at least one of: an extended Kalman filter with augmented state space and a forward model of classic equations of motion.

6. A robotic device, comprising:
a chassis;
a set of wheels;
one or more motors to drive the set of wheels;
a controller in communication with the one or more motors;
at least one sensor;
a camera;
one or more processors;
a tangible, non-transitory, machine readable medium storing instructions that when executed by the one or more processors effectuate operations comprising:

capturing, with the camera of the robotic device, spatial data of surroundings of the robotic device;

generating, with the one or more processors of the robotic device, a movement path based on the spatial data of the surroundings;

predicting, with the one or more processors of the robotic device, a new predicted state of the robotic device, the new predicted state comprising at least a predicted position of the robotic device, wherein predicting the new predicted state of the robotic device comprises:

capturing, with the at least one sensor of the robotic device, movement readings of the robotic device;

predicting, with the one or more processors of the robotic device, the new predicted state of the robotic device using a motion model of the robotic device based on at least one of: a previous predicted state of the robotic device and the movement readings; and updating, with the one or more processors of the robotic device, the movement path to exclude locations of the movement path that the robotic device has previously been predicted to be positioned.

7. The robotic device of claim 6, wherein the at least one sensor comprises at least one of: an odometer, an optical encoder, an inertial measurement unit, a gyroscope, and an imaging device.

8. The robotic device of claim 6, wherein a recurrent neural network is used to learn the motion model of the robotic device and predict the new predicted state of the robotic device based on the learned motion model.

9. The robotic device of claim 8, wherein the recurrent neural network receives the previous predicted state and the movement readings as input and outputs the new predicted state of the robotic device, and wherein the new predicted state is fed back and used as the previous predicted state input of the recurrent neural network.

10. The robotic device of claim 8, wherein predicting the new predicted state of the robotic device further comprises:

determining, by the one or more processors of the robotic device, a true position of the robotic device based on the spatial data of the surroundings;

determining, by the one or more processors of the robotic device, a prediction error based on the true position of the robotic device and the new predicted position of the robotic device predicted using the motion model of the recurrent neural network; and updating, by the one or more processors of the robotic device, the recurrent neural network by backpropagating the error through the recurrent neural network to reduce the prediction error of the recurrent neural network.

11. The robotic device of claim 6, wherein the spatial data comprises at least one of: depth data and image data of the surroundings.

12. The robotic device of claim 6, wherein a recurrent neural network receives the previous predicted state and the movement readings as input and outputs the predicted position and a predicted velocity of the robotic device, and wherein the motion model receives the predicted position, predicted velocity and the previous predicted state as input and outputs the new predicted state.

13. The robotic device of claim 12, wherein the motion model comprises a forward model of classic equations of motion.

14. The robotic device of claim 12, wherein predicting the new state of the robotic device further comprises:

determining, by the one or more processors of the robotic device, the true position of the robotic device based on the spatial data of the surroundings;

determining, by the one or more processors of the robotic device, a prediction error based on the true position of the robotic device and the mew predicted position of the robotic device predicted using the forward model of classic equations of motion; and updating, by the one or more processors of the robotic device, the recurrent neural network by backpropagating the error through the recurrent neural network to reduce the prediction error of the recurrent neural network.

15. The robotic device of claim 6, wherein a recurrent neural network receives the previous predicted state and the movement readings as input and outputs model parameters of the motion model, and wherein the motion model receives the model parameters, the previous predicted state and the movement readings as input and outputs the new predicted state.

16. The robotic device of claim 15, wherein predicting the new predicted state of the robotic device further comprises:
   determining, by the one or more processors of the robotic device, the true position of the robotic device based on the spatial data of the surroundings;
   determining, by the one or more processors of the robotic device, a prediction error based on the true position of the robotic device and the new predicted position of the robotic device predicted using the motion model; and
   updating, by the one or more processors of the robotic device, the recurrent neural network by backpropagating the error through the recurrent neural network to reduce the prediction error of the recurrent neural network.

17. The robotic device of claim 6, wherein the motion model comprises at least one of: an extended Kalman filter with augmented state space and a forward model of classic equations of motion.

18. The robotic device of claim 6, wherein the motion model receives the previous predicted state, the movement readings, and model parameters as input and outputs the new predicted state.

19. The robotic device of claim 18, wherein predicting the new predicted state of the robotic device further comprises:
   determining, by the one or more processors of the robotic device, the true position of the robotic device based on the spatial data of the surroundings;
   determining, by the one or more processors of the robotic device, a prediction error based on the true position of the robotic device and the new predicted position of the robotic device predicted using the motion model; and
   updating, by the one or more processors of the robotic device, the model parameters based on the prediction error, such that the model parameters are perturbed in the direction which reduces the prediction error the most.

20. The robotic device of claim 19, wherein the model parameters are updated based on previous model parameters, the prediction error and at least one of: tracking error gradient descent, tracking error gradient descent with normalized gradient, forgetting factor, and Kalman gain.

* * * * *